(12) United States Patent
Schuetz

(10) Patent No.: US 12,630,165 B2
(45) Date of Patent: May 19, 2026

(54) METHOD FOR CHECKING THE PLAUSIBILITY OF A ROTATION RATE OF A VEHICLE BODY OF A VEHICLE AND DEVICE FOR CARRYING OUT THE METHOD

(71) Applicant: Knorr-Bremse Systeme Fuer Nutzfahrzeuge GmbH, Munich (DE)

(72) Inventor: Lukas Schuetz, Karlsruhe (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 18/832,257

(22) PCT Filed: Feb. 13, 2023

(86) PCT No.: PCT/EP2023/053476
§ 371 (c)(1),
(2) Date: Jul. 23, 2024

(87) PCT Pub. No.: WO2023/161057
PCT Pub. Date: Aug. 31, 2023

(65) Prior Publication Data
US 2025/0145163 A1 May 8, 2025

(30) Foreign Application Priority Data

Feb. 23, 2022 (EP) ..................................... 22158263

(51) Int. Cl.
B60W 40/112 (2012.01)
B60W 40/11 (2012.01)
B60W 50/02 (2012.01)
(52) U.S. Cl.
CPC ........... B60W 40/112 (2013.01); B60W 40/11 (2013.01); B60W 50/0205 (2013.01);
(Continued)

(58) Field of Classification Search
CPC .. B60W 40/107; B60W 40/109; B60W 40/11; B60W 40/112; B60W 50/0205;
(Continued)

(56) References Cited

U.S. PATENT DOCUMENTS 5,719,790 A * 2/1998 Lohrenz ................. G01D 3/028
702/96
2003/0163231 A1* 8/2003 Meyers ............... B60T 8/17554
701/1
(Continued)

FOREIGN PATENT DOCUMENTS

DE        19819780 A1    11/1998
DE     102004020927 A1    11/2005
(Continued)

OTHER PUBLICATIONS

Ding E.L. et al., "Estimation of Vehicle Roll Angle," Department of Physical Engineering, University of Applied Sciences Gelsenkirchen, Germany, 2005 IFAC, pp. 122-127.
(Continued)

*Primary Examiner* — John M Zaleskas
(74) *Attorney, Agent, or Firm* — NORTON ROSE FULBRIGHT US LLP

(57) ABSTRACT

A computer-implemented method for checking the plausibility of a measured or determined roll rate of a vehicle body of a vehicle about a longitudinal axis of the vehicle, in which a transverse acceleration change or a transverse jerk is calculated from a measured or determined transverse acceleration in the transverse direction of the vehicle, on the basis of which plausible value or a plausible range for the roll rate is determined.

9 Claims, 4 Drawing Sheets

(52) U.S. Cl.
CPC ................ *B60W 2050/021* (2013.01); *B60W 2050/0215* (2013.01); *B60W 2520/105* (2013.01); *B60W 2520/125* (2013.01); *B60W 2520/16* (2013.01); *B60W 2520/18* (2013.01); *B60W 2552/15* (2020.02); *B60W 2720/16* (2013.01); *B60W 2720/18* (2013.01)

(58) Field of Classification Search
CPC ..... B60W 2030/041; B60W 2030/043; B60W 2050/021; B60W 2050/0215; B60W 2520/105; B60W 2520/125; B60W 2520/16; B60W 2520/18; B60W 2720/16; B60W 2720/18; B60G 2400/0521; B60G 2400/0522; B60G 2400/104; B60G 2400/106
See application file for complete search history.

(56) References Cited

U.S. PATENT DOCUMENTS

| | | | |
|---|---|---|---|
| 2003/0236604 A1* | 12/2003 | Lu | B62D 6/04 701/45 |
| 2004/0030474 A1* | 2/2004 | Samuel | B60G 17/0185 701/31.4 |
| 2004/0249545 A1* | 12/2004 | Lu | B60T 8/172 701/70 |
| 2005/0004730 A1* | 1/2005 | Suzuki | B60G 17/015 701/38 |
| 2005/0080542 A1* | 4/2005 | Lu | B60W 40/064 701/91 |
| 2005/0080543 A1* | 4/2005 | Lu | B60G 17/0195 701/91 |
| 2005/0080544 A1* | 4/2005 | Suzuki | B60W 40/11 340/440 |
| 2006/0155440 A1* | 7/2006 | Gleacher | B60G 17/0195 701/38 |
| 2007/0067085 A1* | 3/2007 | Lu | B60W 40/114 340/440 |
| 2008/0015764 A1* | 1/2008 | Watanabe | B60W 50/0205 701/72 |
| 2008/0059034 A1* | 3/2008 | Lu | B60T 8/17552 701/41 |
| 2008/0082246 A1* | 4/2008 | Brown | B60T 8/17552 701/91 |
| 2008/0086248 A1* | 4/2008 | Lu | B60W 40/101 701/41 |
| 2008/0275664 A1* | 11/2008 | Schmid | B60W 50/0205 702/141 |
| 2010/0017058 A1* | 1/2010 | Lu | B60W 40/11 701/38 |
| 2010/0017059 A1* | 1/2010 | Lu | B60W 40/112 701/38 |
| 2010/0017061 A1* | 1/2010 | Lu | B60W 40/11 701/41 |
| 2010/0017066 A1* | 1/2010 | Lu | B60T 8/24 701/41 |
| 2010/0023205 A1* | 1/2010 | Schmitt | B60W 50/045 701/29.2 |
| 2011/0004359 A1* | 1/2011 | Kretschmann | B60W 40/11 701/1 |
| 2011/0087398 A1* | 4/2011 | Lu | B60G 17/019 701/31.4 |
| 2011/0130926 A1* | 6/2011 | Lu | B60T 8/171 701/1 |
| 2011/0226036 A1* | 9/2011 | Jiang | B60W 40/114 73/1.37 |
| 2013/0103252 A1* | 4/2013 | Bentele-Calvoer | G06F 17/00 701/31.1 |
| 2015/0308827 A1* | 10/2015 | Fujii | G01C 19/00 702/151 |
| 2017/0166219 A1* | 6/2017 | Jammoussi | G08G 1/0125 |
| 2017/0297562 A1* | 10/2017 | Chen | B60W 50/029 |
| 2019/0291742 A1* | 9/2019 | Leach | B60W 50/0097 |
| 2020/0369287 A1* | 11/2020 | John | B60R 21/01 |
| 2022/0204002 A1* | 6/2022 | Hosoya | G05D 1/027 |
| 2022/0388485 A1* | 12/2022 | Hirao | B60G 17/08 |

FOREIGN PATENT DOCUMENTS

| | | | | |
|---|---|---|---|---|
| DE | 102006042961 A1 | | 4/2007 | |
| DE | 102007037508 A1 | | 3/2008 | |
| DE | 102009002214 A1 | | 10/2010 | |
| DE | 102016123875 A1 | | 6/2017 | |
| DE | 102017208375 A1 | | 11/2018 | |
| DE | 102018204286 A1 | | 9/2019 | |
| JP | 10142256 A | * | 5/1998 | |
| JP | 2007145113 A | * | 6/2007 | |
| JP | 2009236788 A | * | 10/2009 | |
| KR | 20070052619 A | * | 5/2007 | B60T 17/221 |
| WO | WO-2008135314 A1 | * | 11/2008 | B60W 40/109 |
| WO | 2021059845 A1 | | 4/2021 | |

OTHER PUBLICATIONS

International Search Report for PCT/EP2023/053476 dated May 15, 2023.

* cited by examiner

METHOD FOR CHECKING THE PLAUSIBILITY OF A ROTATION RATE OF A VEHICLE BODY OF A VEHICLE AND DEVICE FOR CARRYING OUT THE METHOD

FIELD OF THE INVENTION

The invention relates to a method for checking the plausibility of a determined or recorded rotation rate of a vehicle body of the vehicle and to a device for carrying out the method.

BACKGROUND INFORMATION

In vehicle dynamics control systems, for example an ESP, sensors for measuring accelerations and rotation rates are used to record vehicle motion. The sensors are generally installed permanently on the vehicle body and, depending on the embodiment, measure up to six degrees of freedom of the vehicle body, consisting of accelerations and rotation rates, in each case in all three axes of the Cartesian vehicle coordinate system. To avoid malfunctions in a vehicle dynamics control systems, the measurement signals from the sensors need to be monitored for plausibility. The rotation rate about the vertical axis (yaw rate) and the acceleration in the transverse direction of the vehicle (lateral acceleration) are the most important variables in this case from the point of view of vehicle dynamics control. Accordingly, these sensors are configured such that they record at least yaw rate and often also lateral acceleration. To monitor plausibility, these two variables can be converted into one another using additional measured variables. More and more commonly sensors are being used that record other degrees of freedom, often all six degrees of freedom. This means that other methods are needed for monitoring the plausibility of the additionally recorded degrees of freedom.

Other understood methods for monitoring a sensor system for recording vehicle motion in general provide for redundant measurement of the applicable variable by at least two sensors, for example. If the measured values from the redundant sensors differ from one another too greatly, a fault is detected, as in DE102018204286A1. DE102017208375A1 presents a method for detecting an incorrectly operating rotation rate sensor. Specifically, this involves monitoring the roll rate by using the rotation rate signal to determine a roll angle and checking whether said roll angle is within a valid range. The determination of a roll angle from the roll rate signal is subject to errors due to noise and offsets in the sensor system. For this reason, another measured variable is generally used for support. The result of this is that it is no longer possible to identify which measured variable is the cause of any error. DE102004020927A1 presents a method for checking the functionality of a sensor by comparing the physical measured variable to be monitored with the aid of another sensor, which records a second physical measured variable that can be converted into the physical variable to be monitored. As an example, the computation of a rotation rate about the longitudinal and transverse axes of the vehicle from measured spring travels or wheel loads is proposed. If the rotation rate computed in this way differs from the directly measured rotation rate too greatly, an error is recognized.

Therefore, either such methods for monitoring rotation rates about the longitudinal and transverse axes of a vehicle presuppose that the applicable sensor system is installed redundantly, or alternatively a sensor system for recording a different physical variable that correlates with the rotation rate is installed. This involves corresponding additional costs.

Other approaches from the literature use models that reproduce the motion of the vehicle body. Using one or more input variables (for example steering angle and vehicle velocity), these models can be used to make statements about the motion of the vehicle body and therefore about the rotation rates about the longitudinal and transverse axes of the vehicle. These statements can be compared with the measurement signals from the sensor, and variances can be determined. These model-based approaches are highly dependent on the quality of the modelling and of the model parameters. The model parameters need to be determined afresh for each vehicle variant or estimated in a complicated manner, which involves corresponding additional outlay.

SUMMARY OF THE INVENTION

An object of the invention is to provide methods for checking the plausibility of recorded or determined rotation rates about the longitudinal and transverse axes of a vehicle (roll and pitch rates). Furthermore, a device for carrying out the method is also intended to be disclosed.

This object may be achieved by the features of the exemplary embodiments as described herein.

A first aspect of the invention discloses a computer-implemented method for checking the plausibility of a measured or recorded roll rate ($\dot{\varphi}$) of a vehicle body of a vehicle about a longitudinal axis of the vehicle, in which a measured or determined lateral acceleration ay in the transverse direction y of the vehicle is used to compute a change in lateral acceleration $\dot{a}y$ or a lateral jerk jy that is taken as a basis for determining a plausible value or a plausible range 4 for the roll rate ($\dot{\varphi}$).

The method can involve the plausible range of the plausible value for the roll rate ($\dot{\varphi}$) being determined on the basis of a functional dependency of the roll rate ($\dot{\varphi}$) on the change in lateral acceleration $\dot{a}y$ or on the lateral jerk jy.

The functional dependency may be a linear dependency and may be formed by a straight line having a gradient 1/g, where g is gravitational acceleration. The plausible range for the roll rate ($\dot{\varphi}$) may also comprise a tolerance band with the straight line, in particular as the centerline. Additionally, the plausible range for the roll rate ($\dot{\varphi}$) may comprise an extended range that extends from the value zero for the roll rate ($\dot{\varphi}$) to the tolerance band.

The method can involve checking whether the measured or determined roll rate ($\dot{\varphi}$) is outside or within the plausible range for the roll rate ($\dot{\varphi}$).

If, in this embodiment of the method, it has then once or repeatedly been identified that a measured or determined roll rate ($\dot{\varphi}$) is outside or not within the plausible range 4 for the roll rate ($\dot{\varphi}$) then a Not-Plausible signal can be generated that assesses the measured or determined roll rate ($\dot{\varphi}$) as not plausible. Otherwise, if it has repeatedly or once been identified that the measured or determined roll rate ($\dot{\varphi}$) is within the plausible range for the roll rate ($\dot{\varphi}$) then for example no Not-Plausible signal is generated and a plausible value for the measured or determined roll rate ($\dot{\varphi}$) is assumed.

Another aspect of the invention discloses a computer-implemented method for checking the plausibility of a measured or determined pitch rate ($\dot{\theta}$) of a vehicle body of a vehicle about a transverse axis y of the vehicle, in which a measured or determined longitudinal acceleration ax in the longitudinal direction x of the vehicle 1 is used to compute a change in longitudinal acceleration àx or a longitudinal jerk jk that is taken as a basis for determining a plausible value or a plausible range for the pitch rate ($\dot{\theta}$).

The method can involve determining the plausible range or the plausible value for the pitch rate ($\dot{\theta}$) on the basis of a functional dependency of the pitch rate ($\dot{\theta}$) on the change in longitudinal acceleration ex or on the longitudinal jerk jx.

The functional dependency may be a linear dependency and may be formed by a straight line having a gradient −1/g, where g is gravitational acceleration.

The plausible range for the pitch rate ($\dot{\theta}$) may also comprise a tolerance band with the straight line, in particular as the centerline. The plausible range for the pitch rate ($\dot{\theta}$) may also comprise at least one extended range that extends from the value zero for the pitch rate ($\dot{\theta}$) to the tolerance band.

The method may involve a check being performed to ascertain whether the measured or determined pitch rate ($\dot{\theta}$) is outside or within the plausible range for the pitch rate ($\dot{\theta}$).

If it has then once or repeatedly been identified that a or the measured or determined pitch rate ($\dot{\theta}$) is outside or not within the plausible range for the pitch rate ($\dot{\theta}$) then a Not-Plausible signal is generated that assesses the measured or determined pitch rate ($\dot{\theta}$) as not plausible. Otherwise, if it has once or repeatedly been identified that the measured or determined pitch rate ($\dot{\theta}$) is within the plausible range for the pitch rate ($\dot{\theta}$) then for example no Not-Plausible signal is generated and a plausible value for the measured or determined pitch rate ($\dot{\theta}$) is assumed.

According to another aspect, the invention discloses a device for carrying out the method described above, comprising at least: a sensor apparatus having at least one acceleration sensor, which records for example a longitudinal acceleration ax and/or a lateral acceleration ay of the vehicle body, and having at least one rotation rate sensor, which records for example the pitch rate ($\dot{\theta}$) and/or the roll rate ($\dot{\varphi}$) of the vehicle body, and also a computing and evaluation apparatus that processes acceleration signals from the at least one acceleration sensor and the at least one rotation rate sensor.

An exemplary embodiment of the invention is explained more thoroughly in the description below with reference to the figures.

DETAILED DESCRIPTION

Figure 1:
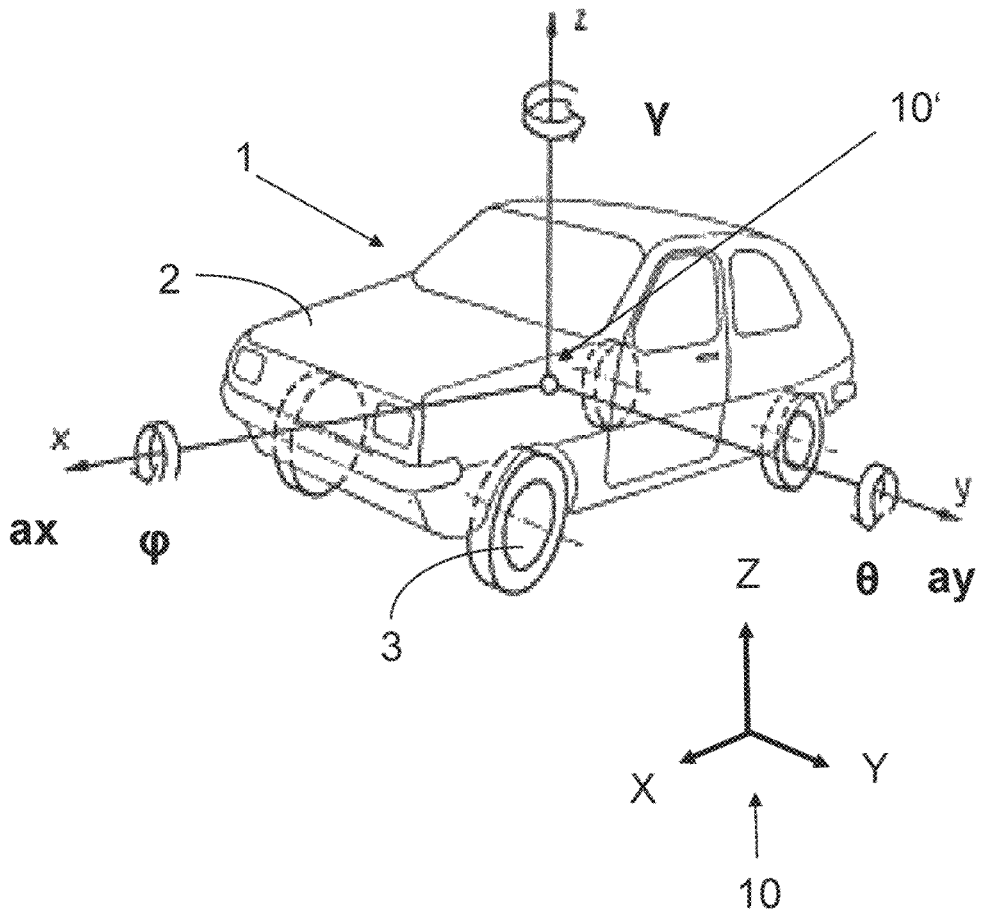
FIG. 1 shows a perspective representation of a vehicle for which a method for checking the plausibility of a measured rotation rate of the vehicle body according to an exemplary embodiment of the method according to the invention is performed.

An exemplary embodiment of the method according to the invention is based on the physical backgrounds explained below. In an Earth-fixed coordinate system 10 (X, Y, Z) as shown in FIG. 1, gravitational acceleration g acts in the direction of the center of the earth, that is to say in the direction of the vertical axis Z. If for example a vehicle body 2 of a vehicle 1 is twisted with respect to the Earth-fixed coordinate system 10 (X, Y, Z) about the longitudinal axis (x-axis) and/or the transverse axis (y-axis) of a vehicle-fixed vehicle coordinate system 10' (x, y, z) of the vehicle 1, the absolute value of the components of the gravitational acceleration g that are measured on these axes changes. That is to say that if the twist of the vehicle body 2 changes, the measured accelerations also change. It is irrelevant what the cause of the change in twist is. Possible causes are for example a change in the inclination of the ground or a change in the angles of the vehicle body 2 with respect to the chassis 3 of the vehicle 1, for example as a result of the initiation of braking of the vehicle 1, the vehicle body 2 then rotating about the y-axis of the vehicle-fixed vehicle coordinate system 10' (x, y, z) (pitching). That component of the gravitational acceleration g that is measured along the longitudinal axis x and/or along the transverse axis y of the vehicle 1 can be determined from trigonometric relationships. As the expected maximum twists of the vehicle body 2 are in a low range (<20°), the trigonometric functions can be approximated as linear by small angle approximation. The following relationships are thus obtained for the measured components $a_x$ and $a_y$ of the gravitational acceleration g in the x- and y-directions of the vehicle-fixed vehicle coordinate system 10' (x, y, z):

$$a_x = -g \cdot \theta \qquad (1)$$

$$a_y = g \cdot \varphi \qquad (2)$$

where
g: is gravitational acceleration
θ: is the pitch angle of the vehicle body with respect to the Earth-fixed coordinate system 10 (according to DIN ISO 8855)
φ: is the roll angle of the vehicle body with respect to the Earth-fixed coordinate system 10 (according to DIN ISO 8855).

The rotation rates ($\dot{\theta}$) and ($\dot{\varphi}$) can be determined by analytical differentiation:

$$\dot{a}x = -g \cdot \dot{\theta} \leftrightarrow \dot{\theta} = -\dot{a}x/g \qquad (3)$$

$$\dot{a}y = -g \cdot \dot{\varphi} \leftrightarrow \dot{\varphi} = -\dot{a}y/g \qquad (4)$$

The relationship between the rotation rates ($\dot{\theta}$) and ($\dot{\varphi}$) and the changes in acceleration, that is to say the respective jerk jx and jy in the x- and y-directions $$jx = \dot{a}x \qquad (5)$$

$$jy = \dot{a}y \qquad (6)$$

is therefore linear, the linear dependency being defined in each case by a straight line whose gradient is 1/g or −1/g, respectively.

Jerk jx or jy is the instantaneous rate of change in the acceleration ax or ay of the vehicle 1 in the x- or y-direction over time. The SI unit of jerk is m/s³. Formally, jerk is the derivative of acceleration with respect to time, that is to say the second time derivative of velocity and the third time derivative of distance. If, as here, a vehicle-fixed coordinate system $10'$ (x, y, z) is assumed, the jerk can be determined separately for each coordinate direction, here in particular as longitudinal jerk ax or lateral jerk ay, or generally vectorially as the derivative of acceleration a in terms of this vehicle-fixed coordinate system $10'$ (x, y, z).

A rotation rate ($\dot{\theta}$) or ($\dot{\phi}$) not equal to zero thus always has a corresponding jerk jx=áx or jy=áy as its cause. A rotation rate ($\dot{\theta}$) or ($\dot{\phi}$) not equal to zero for a jerk jx=áx or jy=áy equal to zero, or with a jerk jx=áx or jy=áy whose absolute value is too low, is not plausible and therefore indicates an erroneous sensor signal.

Besides gravitational acceleration, linear accelerations due to vehicle dynamics are also recorded by the sensor system, for example. These occur for example in the transverse direction y during cornering and in the longitudinal direction x when the vehicle 1 brakes. These linear accelerations due to vehicle dynamics generally lead to the vehicle body 2 being twisted with respect to the chassis 3. This twist is firstly limited by the configuration and secondly influenced by dampers. It is therefore possible for example for the jerk jx=áx or jy=áy to increase while the rotation rate ($\dot{\theta}$) or ($\dot{\phi}$) remains constant.

Figure 2:
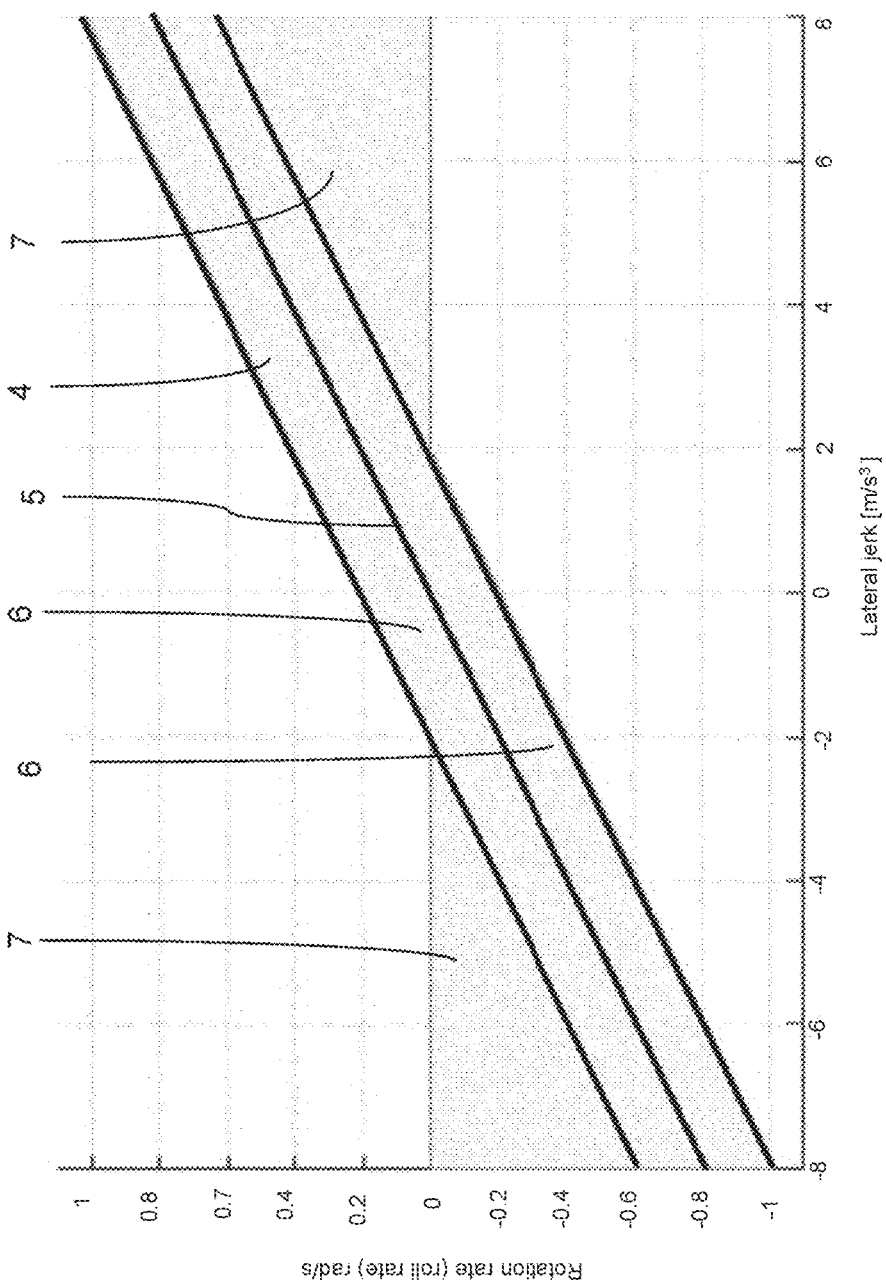
FIG. 2 shows a graph representing a relationship between the roll rate and a lateral jerk of the vehicle from FIG. 1.

The relationships between the jerk jx=áx or jy=áy and the rotation rate ($\dot{\theta}$) (pitch rate) or ($\dot{\phi}$) (roll rate) that have been described above permit a plausible range 4 for the rotation rate ($\dot{\theta}$) or ($\dot{\phi}$) to be defined according to the jerk jx=áx (longitudinal jerk) or jy=áy (lateral jerk). This plausible range is depicted in FIG. 2 with regard to a straight line that represents the—according to equation (4) above—linear relationship between the roll rate 4 (in rad/s) and the lateral jerk jy=áy (in m/s$^3$). This dependency forms a straight line 5 having a gradient 1/g according to equation (4) above and shows the expected relationship between the roll rate ($\dot{\theta}$) (in rad/s) and the lateral jerk jy=áy (in m/s$^3$), without linear accelerations due to vehicle dynamics having been taken into consideration. If for example the twist of the vehicle body 2 with respect to the chassis 3 changes while stationary on account of a change in loading, the roll rate to be expected moves exactly on the straight line 5.

The range with a gray background in FIG. 2 shows the plausible range 4 for the roll rate ($\dot{\phi}$). The plausible range 4 for the roll rate ($\dot{\phi}$) may comprise a tolerance band 6 with the straight line 5 as the centerline. Additionally, the plausible range 4 for the roll rate ($\dot{\phi}$) may comprise an extended range 7 that extends from the value zero for the roll rate ($\dot{\phi}$) to the tolerance band 6 and is essentially formed by two triangular ranges, one of which is arranged on the near side and the other of which is arranged on the far side of the tolerance band 6.

The plausible range for the pitch rate ($\dot{\theta}$) can then be determined analogously on the basis of a straight line that, according to equation (3) above, represents the linear relationship between the longitudinal jerk jx=ex and the pitch rate ($\dot{\theta}$), the gradient of the straight line then having a negative arithmetic sign according to equation (3) above.

As both the roll rate ($\dot{\phi}$) and the pitch rate ($\dot{\theta}$) are a rotation rate, the term "rotation rate" is used in the description of an exemplary embodiment of the method that follows as a replacement for the terms "roll rate ($\dot{\phi}$)" and "pitch rate ($\dot{\theta}$)".

Figure 4:
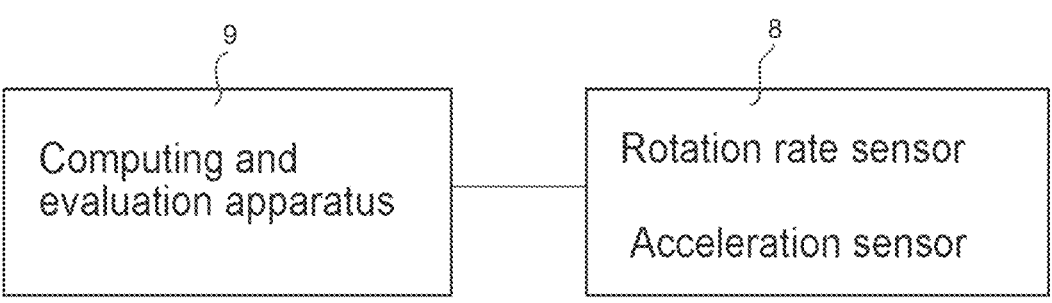
FIG. 4 shows a schematic representation of an exemplary embodiment of an apparatus for carrying out the method from FIG. 3.

As FIG. 4 shows, a device for carrying out the method according to the invention comprises for example a sensor device 8 having an acceleration sensor and a rotation rate sensor and a computing and evaluation apparatus 9 in which a program that performs the method is implemented. The computing and evaluation apparatus comprises in particular at least one microprocessor and a memory. The sensor device introduces for example acceleration signals representing the acceleration a and rotation rate signals representing the rotation rate into the computing and evaluation apparatus, where they are then evaluated for the purposes of the method according to the invention.

Figure 3:
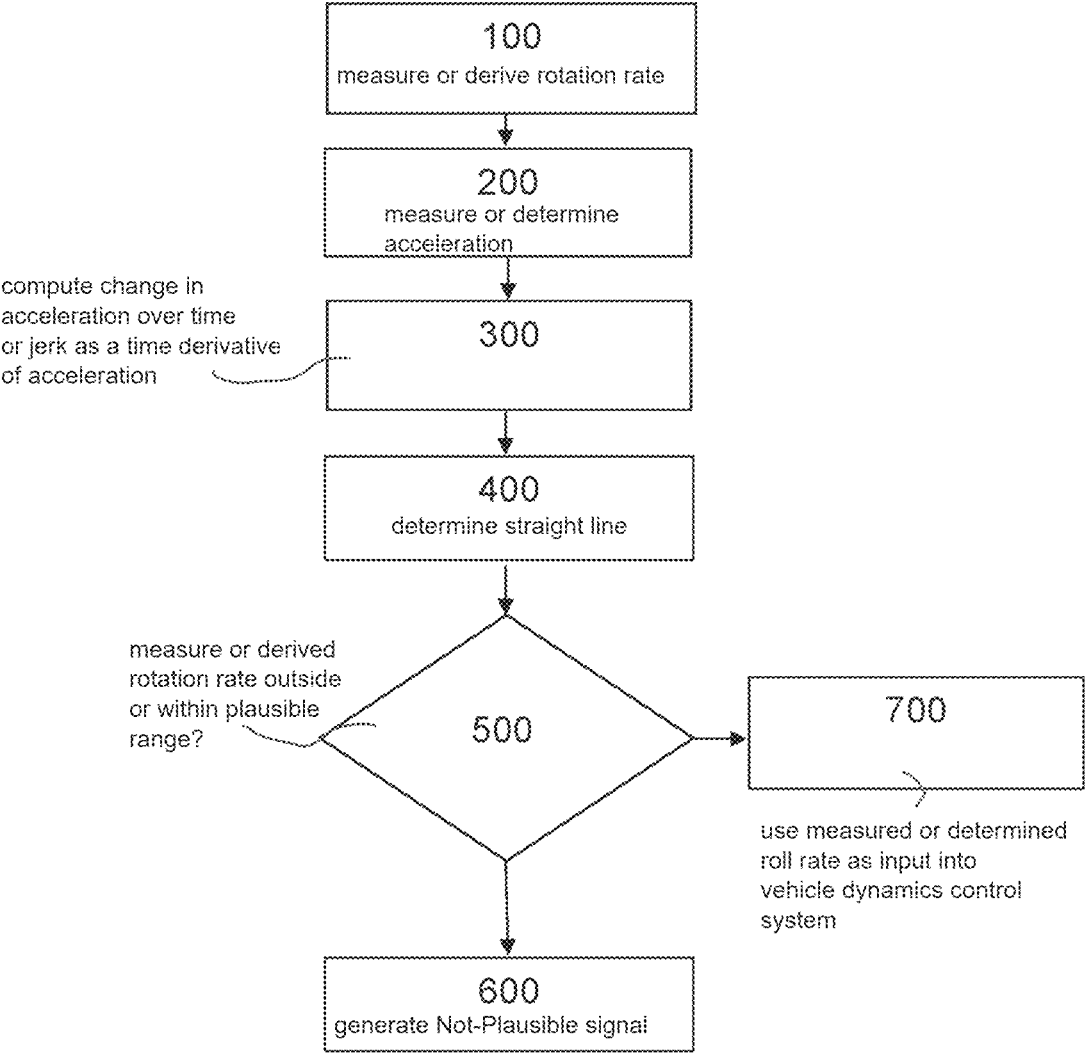
FIG. 3 shows a program flowchart for an exemplary embodiment of the method according to the invention.

This program is described below on the basis of the flowchart depicted in FIG. 3.

In a step 100, for example the rotation rate sensor of the sensor device 8 is used to measure the rotation rate of the vehicle body 2 of the vehicle 1, referring to FIG. 2 for example the roll rate ($\dot{\phi}$). The rotation rate may instead also be derived from a different variable measured by a sensor, however.

In a step 200, the acceleration a of the vehicle is then measured by the acceleration sensor of the sensor device 8 or determined in the computing and evaluation unit from a different variable that affects the vehicle body 2 in the same direction with regard to the rotation rate, referring to FIG. 2 for example the lateral acceleration ay.

In a step 300, the measured or determined acceleration is then used in the computing and evaluation unit to compute the change in acceleration a over time or the jerk j as a time derivative of the acceleration a. The change in acceleration a or the jerk j is then used in the computing and evaluation unit in a step 400 to determine the straight line 5 and, on the basis of this straight line 5, the plausible range 4 for the rotation rate, here in particular for the roll rate ($\dot{\phi}$).

In a step 500, the computing and evaluation unit 9 then checks whether the measured or determined rotation rate is outside or within the plausible range 4. This can be accomplished for example by virtue of a running counter, which may start at zero, being updated by a count, e.g. "0+1", when the measured or determined rotation rate, here in particular the roll rate ($\dot{\phi}$), is outside or not within the plausible range 4. If this updated counter "1" then exceeds a threshold value, e.g. the threshold value "2", this means that the measured or determined rotation rate, in particular the roll rate ($\dot{\phi}$), has been outside the plausible range 4 repeatedly.

A Not-Plausible signal that assesses the (most recently) measured or determined rotation rate, in particular the measured or determined roll rate ($\dot{\phi}$), as not plausible is then generated in the computing and evaluation unit 9 in a step 600. The computing and evaluation unit 9 must therefore have repeatedly identified in step 600 that a measured or determined rotation rate, in particular the measured or determined roll rate ($\dot{\phi}$), has been outside the respective plausible range 4 before the Not-Plausible signal is generated. Alternatively, there may also be provision for the computing and evaluation unit 9 to already generate the Not-Plausible signal if the measured or determined rotation rate, in particular the measured or determined roll rate ($\dot{\phi}$) is outside or not within the plausible range only once in step 500.

Otherwise, i.e. if the computing and evaluation unit has identified in step 500 that the measured or determined rotation rate, in particular the measured or determined roll rate ($\dot{\phi}$), is or has been within or not outside the plausible range 4 once or repeatedly, the computing and evaluation unit 9 generates no Not-Plausible signal and then the measured or determined rotation rate, in particular the measured or determined roll rate ($\dot{\phi}$), is used as an input variable for a vehicle dynamics control system, for example, in a step 700. This can be accomplished by virtue of the computing and evaluation unit 9 then introducing the measured or determined rotation rate, in particular the measured or determined roll rate ($\dot{\phi}$), into the vehicle dynamics control system.

In general, the proposed method is therefore based for example on a measurement of the rotation rates of the vehicle body 2 about at least two axes that are at right angles to one another, here for example about the x-axis (longitudinal axis of the vehicle 1) and the y-axis (transverse axis of the vehicle 2) in the vehicle-fixed coordinate system 10'. The plane that these axes together define may be parallel to a plane defined by the longitudinal axis x and the transverse axis y of the vehicle-fixed coordinate system 10'. Furthermore, the relative twist of the vehicle-fixed coordinate system 10' in relation to the Earth-fixed coordinate system 10 should be known or determined so that the measured rotation rates can be converted into a rotation rate about the longitudinal axis x and a rotation rate about the transverse axis y of the vehicle.

For example another prerequisite is formed by the measurement of the accelerations a of the vehicle body 2, likewise in at least two axes that are at right angles to one another. The measured accelerations, analogously to the rotation rates, may need to be able to be converted into an acceleration ax in the direction of the longitudinal axis x and an acceleration ay in the direction of the transverse axis y of the vehicle 1.

The LIST OF REFERENCE SIGNS is as follows:

1 vehicle
2 vehicle body
3 chassis
4 plausible range
5 straight line
6 tolerance band
7 extended range
8 sensor apparatus
9 computing and evaluation apparatus
10 Earth-fixed coordinate system
10' vehicle-fixed coordinate system
g gravitational acceleration
$\theta$ pitch angle
$\varphi$ roll angle
$(\dot{\theta})$ E pitch rate
$(\dot{\varphi})$ roll rate
$a_x$ longitudinal acceleration
$a_y$ lateral acceleration
$\dot{a}x,jx$ change in longitudinal acceleration/longitudinal jerk
$\dot{a}y,jy$ change in lateral acceleration/lateral jerk

The invention claimed is:

1. A computer-implemented method for checking a plausibility of a measured or determined roll rate of a vehicle body of a vehicle about a longitudinal axis of the vehicle, the method comprising:

measuring or determining the roll rate of the vehicle body;

measuring or determining a lateral acceleration in a transverse direction of the vehicle in a vehicle-fixed coordinate system;

calculating: (i) a change in the lateral acceleration or (ii) a lateral jerk as a time derivative of the lateral acceleration;

determining a straight line with a gradient 1/g, wherein g is gravitational acceleration, wherein the straight line represents a linear dependance of the roll rate from: (i) the change in the lateral acceleration or (ii) the lateral jerk;

determining a plausible range for the roll rate based on the straight line;

determining that the measured or determined roll rate is within the plausible range for the roll rate;

based on determining that the measured or determined roll rate is within the plausible range for the roll rate, providing the measured or determined roll rate to a vehicle dynamics control system of the vehicle; and controlling, by the vehicle dynamics control system, vehicle dynamics of the vehicle using the provided measured or determined roll rate.

2. The method of claim 1, wherein the determining of the plausible range for the roll rate includes determining a tolerance band with the straight line as a centerline of the tolerance band, the tolerance band representing the plausible range for the roll rate.

3. The method of claim 2, wherein determining of the plausible range for the roll rate includes determining at least one extended range that extends from a value zero for the roll rate to the tolerance band.

4. The method of claim 1, further comprising:

measuring or determining a second roll rate of the vehicle body;

determining that the measured or determined second roll rate is outside the plausible range for the roll rate; and based on determining that the measured or determined second roll rate is outside the plausible range for the roll rate, generating a Not Plausible signal that assesses the measured or determined second roll rate as not plausible.

5. A computer-implemented method for checking a plausibility of a measured or determined pitch rate of a vehicle body of a vehicle about a transverse axis of the vehicle, the method comprising:

measuring or determining the pitch rate of the vehicle body;

measuring or determining a lateral acceleration in a transverse direction of the vehicle in a vehicle-fixed coordinate system;

calculating: (i) a change in the lateral acceleration or (ii) a lateral jerk as a time derivative of the lateral acceleration;

determining a straight line with a gradient $-1/g$, wherein g is gravitational acceleration, wherein the straight line represents a linear dependance of the pitch rate from: (i) the change in the lateral acceleration or (ii) the lateral jerk;

determining a plausible range for the pitch rate based on the straight line;

determining that the measured or determined pitch rate is within the plausible range for the pitch rate;

based on determining that the measured or determined pitch rate is within the plausible range for the pitch rate, providing the measured or determined pitch rate to a vehicle dynamics control system of the vehicle; and controlling, by the vehicle dynamics control system, vehicle dynamics of the vehicle using the provided measured or determined pitch rate.

6. The method of claim 5 wherein the determining of the plausible range for the pitch rate includes determining a tolerance band with the straight line as a centerline of the tolerance band, the tolerance band representing the plausible range for the pitch rate.

7. The method of claim 6, wherein the determining of the plausible range for the pitch rate includes determining at least one extended range that extends from a value zero for the pitch rate to the tolerance band.

8. The method of claim 5, further comprising:

measuring or determining a second pitch rate of the vehicle body:

determining that the measured or determined second pitch rate is outside the plausible range for the pitch rate; and based on determining that the measured or determined second pitch rate is outside the plausible range for the pitch rate, generating a Not Plausible signal that assesses the measured or determined second pitch rate as not plausible.

9. An apparatus for checking a plausibility of a measured or determined roll rate of a vehicle body of a vehicle about a longitudinal axis of the vehicle, comprising:

a) a sensor apparatus having at least one acceleration sensor and at least one rotation rate sensor; and b) a computing and evaluation apparatus that processes acceleration signals from the at least one acceleration sensor and the at least one rotation rate sensor;

wherein the computing and evaluation apparatus is configured for checking the plausibility of the measured or recorded roll rate of the vehicle body of the vehicle about the longitudinal axis of the vehicle, by performing the following:

measuring or determining the roll rate of the vehicle body;

measuring or determining a lateral acceleration in a transverse direction of the vehicle in a vehicle-fixed coordinate system;

calculating: (i) a change in the lateral acceleration or (ii) a lateral jerk as a time derivative of the lateral acceleration;

determining a straight line with a gradient 1/g, wherein g is gravitational acceleration, wherein the straight line represents a linear dependance of the roll rate from:

(i) the change in the lateral acceleration or (ii) the lateral jerk;

determining a plausible range for the roll rate based on the straight line;

checking whether the measured or determined roll rate is outside or within the plausible range for the roll rate;

providing, depending on a result of the checking, the measured or determined roll rate to a vehicle dynamics control system of the vehicle; and controlling, by the vehicle dynamics control system, vehicle dynamics of the vehicle using the provided measured or determined roll rate.

* * * * *